United States Patent [19]
Ueno et al.

[11] Patent Number: 4,752,119
[45] Date of Patent: Jun. 21, 1988

[54] ELECTROCHROMIC DISPLAY DEVICES

[76] Inventors: Toshihiko Ueno, c/o Nec Corporation,33-1, Shiba 5-chome, Minato-ku, Tokyo; Yasutaka Shimidzu, 11-3, Koufudai 5-chome, Toyono-cho, Toyono-gun, Osaka, both of Japan

[21] Appl. No.: 765,463

[22] Filed: Aug. 14, 1985

[30] Foreign Application Priority Data

Aug. 14, 1984 [JP] Japan .................................. 59-169513
Aug. 14, 1984 [JP] Japan .................................. 59-169514

[51] Int. Cl.$^4$ .............................................. G02F 1/23
[52] U.S. Cl. ..................................................... 350/357
[58] Field of Search ...................... 350/357; 252/408.1, 252/600

[56] References Cited

U.S. PATENT DOCUMENTS

| | | | |
|---|---|---|---|
| 4,212,518 | 7/1980 | Imataki | 350/357 |
| 4,285,575 | 8/1981 | Imataki | 350/357 |
| 4,402,573 | 9/1983 | Jones | 350/357 |
| 4,482,216 | 11/1984 | Hashimoto et al. | 350/357 |

FOREIGN PATENT DOCUMENTS

2083643 3/1982 United Kingdom ................ 350/357

OTHER PUBLICATIONS

Ueno et al., "Three Color Switching Electrochromic Display using Organic Redox-Pair Dyes", Japanese Jr. of App. Physics, 3-1985, pp. L178-L180.

Primary Examiner—William H. Punter

[57] ABSTRACT

An electrochromic display devices using a specific type of diphenylamine as an electrochromic material is described. The diphenylamine compound, which is dissolved in an inert solvent along with an electrolyte, can undergo electrochemically reversible color formation and erasure reactions and form two different colors at one of electrodes on application of two different potentials across the electrodes. Multicolor devices are also described in which the diphenylamine compound capable of forming colors by oxidation is used in combination with an anthraquinone compound which is capable of forming a color, different from the colors of the oxidized species of the diphenylamine compound, at the same electrode by reduction.

22 Claims, 1 Drawing Sheet

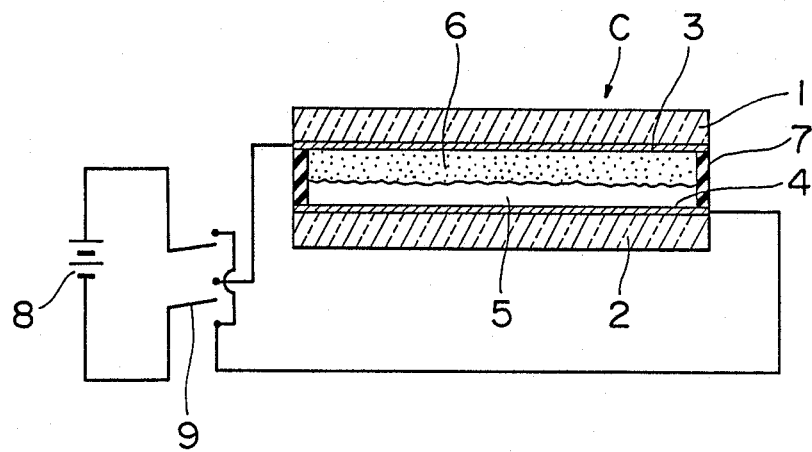

ELECTROCHROMIC DISPLAY DEVICES

BACKGROUND OF THE INVENTION

1. Field of the Invention

This invention relates to electrochromic display devices utilizing a specific type of organic electrochromic material.

2. Description of the Prior Art

Electrochromic devices utilizing organic electrochromic materials have been long expected to be reduced to practice because of the advantages involved, i.e. multicolor display will be possible with clear images and the devices can be operated at low power and low voltage. However, satisfactory devices have never been in use. The main reason for this is that known electrochromic devices are not stable in operation and have not long life enough for practical applications. Typical electrochromic devices using organic electrochromic materials are described, for example, in Appl. Phys. Lett. 23 (1973), page 64, in which viologen is utilized as the electrochromic material. This device has, however, color-reversal on-off switching cycles on the order of about $10^5$, which are much lower than minimum practically-required cycles on the order of $10^6$. Presumably, this is because the deposition and redissolution phenomenon of viologen accompanied by the color formation and erasure do not proceed reversibly in a stable manner.

Another reason is that the display color is purple inherent to viologen and is not satisfactory in view of the demand for multicolor display.

Although most known electrochromic devices are monocolor displays, which show one display color on a white background, a few multicolor electrochromic devices are known. In one such device, there is used a transparent electrode on which the complex of a lanthanide metal and diphthalocyanine is vacuum-deposited in the form of a film. This device permits at least three color changes including red, green and blue but it is disadvantageous in that the device is difficult to make, the complex material is expensive, and the color change characteristics are not reliable. In addition, this device is always kept in colored state, which is disadvantageous from the practical standpoint because of the absence of the white color or colorless background which indicates a non-display condition. Other type of multicolor system is described, for example, U.S. Pat. No. 3,451,741 in which a specific type of reductant/oxidant pair is used for multicolor service. However, this system is not always satisfactory in practice.

SUMMARY OF THE INVENTION

It is an object of the invention to provide electrochromic devices utilizing a specific type of organic electrochromic material which is capable of forming different colors suitable for use in display devices and which undergo stable electrochemical color-reversal reactions whereby color formation and erasure are reversibly feasible.

It is another object of the invention to provide electrochromic display devices which can display multicolors in one unit cell.

It is a further object of the invention to provide electrochromic display devices which are easy to make, inexpensive and good at reproducibility.

In accordance with one embodiment of the invention, there is provided an electrochromic device which comprises a unit cell having a pair of electrodes spaced from each other, a means for applying a potential across the cell and for reversing the electrode polarity, and an electrochromic solution filled in the cell. At least one of the electrodes should be transparent for display service. The present invention is characterized by the electrolytic color change solution which comprises an electrolyte for rendering the solution electrolytically conductive and a specific type of diphenylamine compound, serving as an electrochromic material, which is able to develop at least one color on application of a potential across the cell, once formed color being erasable by changing the polarity of the applied potential or returning the potential to zero. The electrolyte and the organic electrochromic material are dissolved in suitable liquid mediums which are inert thereto. The diphenylamine compounds are electrochromic materials of the type which are colorless or almost colorless in neutral state and develop color by oxidation thereof.

According to another embodiment of the invention, there is also provided a multicolor electrochromic device in which the electrochromic solution defined in the first embodiment further comprises an electrochromic material of a type which is able to form a color by reduction.

BRIEF DESCRIPTION OF THE DRAWING

A sole figure is a schematic sectional view of an electrochromic device according to the invention.

DETAILED DESCRIPTION AND EMBODIMENTS OF THE INVENTION

Reference is now made to the sole figure in which there is generally shown an electrochromic display cell C according to the invention. The cell C has glass substrates 1,2 having a display electrode 3 and a counter electrode 4, respectively, which are spaced from each other. The display electrode 3 should be transparent and may be any known materials ordinarily used for these purposes. In general, the display electrode is made of an indium-tin oxide film or tin oxide ($SnO_2$) film. On the other hand, the counter electrode may be made of the same materials as mentioned with regard to the display electrode, or may be made of metallic films such as platinum or Au film or a film obtained by pressing a mixture of an iron complex or $MnO_2$ and carbon. In the latter case, the counter electrode is not transparent.

The cell C is assembled using two substrates 1,2 having the paired electrodes 3,4 and a frame or gasket 7 provided between the electrodes to establish a chamber in which an electrochromic solution 5, as will be described in detail hereinafter, is filled. Reference number 6 indicates an optical diffuser 6. As a matter of course, any sealant may be used to seal the cell C and includes, for example, epoxy resins, paraffin wax, rubbers, various other synthetic resins and water glass. The gasket 7 may be made, for example, of glass or other suitable materials. The optical diffuser 6 is a porous layer of an insulative or semiconductive white powder, such as titanium dioxide or alumina, having a size of 1 micron to several microns. This layer may be formed by a printing technique in which a dispersion of the powder in a suitable liquid medium such as propylene carbonate is onto the electrode layer 3 on the substrate 1 and dried to form a porous layer of several tens microns in thickness. Because of the pores existing in the layer, an electrochromic solution can freely pass through the layer.

Alternatively, the optical diffuser 6 may be a perforated thin sheet such as of ceramics including alumina, polymeric materials and the like. If the perforated thin sheet is used, it may be merely provided between the electrodes. Of these, a titanium dioxide layer is better in view of the fact that it allows a clearer color to appear on the white background.

In operation, voltage is applied from a power source 8 across the electrodes 1, 2 so that the voltage at the display electrode 3 becomes positive whereupon a clear color, resulting from the color change reaction of an electrochromic material contained in the electrochromic solution described hereinafter, appears on the white background produced by the optical diffuser. If the potential is returned at zero or the electrode polarity is reversed by a double-pole, double-throw switch 9, the generated color is erased or bleached. The cell is not limited to that illustrated in the figure, but may take any other forms. Additionally, the cell may further comprise a mask of a desired pattern on the inner surface of the display electrode, by which a colored image corresponding to the pattern can be displayed. Alternatively, a multitude of cells may be assembled so that individual cells are controlled by a suitably control means to form a desired colored image as a whole. It should be noted that the present invention is not directed to the construction of the display device, but its feature rather resides in a specific type of electrochromic material used singly or in combination with other type of electrochromic material.

The electrolytically-conductive electrochromic solution is now described in detail. The solution contains a supporting electrolyte and an electrochromic material or compound of a specific type, both dissolved in chemically stable solvents which are inert to the electrodes, electrolyte and electrochromic material. The solvent should have great polarity and should be chemically stable. Examples of the solvents include non-aqueous solvents such as propylene carbonate, dimethylformamide, diethylformamide, N-methyl-2-pyrrolidone gamma-butyllactone, tetrahydrofuran, acetonitrile and the like. Of these, propylene carbonate is preferred because it has higher dissolving powder and can withstand higher potential without decomposition.

The supporting electrolytes are, for example, salts of alkali metal and quaternary ammonium cations and perchlorate ($ClO_4^-$), halogen, fluoroborate ($BF_4^-$) and fluoprophosphate ($PF_6^-$) anions. Specific examples of alkali metals include Li, Na and K and halogens include Cl, Br, I and F. The supporting electrolyte is generally used in an amount ranging from 0.01 to 1.0 mole per liter of the solvent in order to ensure the conductivity sufficient for the color change reactions though the concentration may vary depending on the distance between the paired electrodes, the type of electrochromic material and the applied voltage. It will be noted that the distance between the electrodes of the cell of the type described herein is ordinarily in the range of 20 to 100 microns.

The electrochromic materials used in the present invention should electrochemically undergo color change reactions and can form at least one color or colored species at one transparent electrode which is then erasable as desired. In the practice of the invention, diphenylamines of the following general formula are used

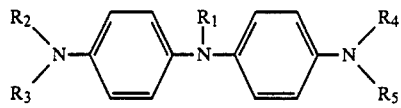

in which $R_1$ represents a hydrogen atom, unsubstituted or substituted alkyl group or unsubstituted or substituted aralkyl, and $R_2$, $R_3$, $R_4$ and $R_5$ independently represent a hydrogen atom, unsubstituted or substituted alkyl, aralkyl and aryl groups, and unsubstituted cycloalkyl group. The unsubstituted or substituted alkyl group represented by $R_1$ through $R_5$ has from 1 to 12 carbon atoms and includes, for example, methyl, ethyl, propyl, butyl, pentyl, hexyl, heptyl, octyl, nonyl, decyl, undecyl, dodecyl, methoxyethyl, ethoxyethyl and the like. Iso isomers are also included. Likewise, the aralkyl includes, for example, benzyl, phenylethyl, methylbenzyl, methoxybenzyl and the like. The unsubstituted or substituted aryl may be phenyl, tolyl, xylyl, biphenyl, propylphenyl, hexylphenyl, methoxyphenyl, ethoxyphenyl and the like. The cycloalkyl group has from 3 to 12 carbon atoms and is preferred to be cycopentyl or cyclohexyl.

These diphenylamines may be readily prepared by any known techniques, for example, using unsubstituted or substituted phenylenediamine and unsubstituted or substituted aniline hydrochloride under conditions well known in the art.

Of these diphenylamines, preferred examples are include 4,4'-bis(dimethylamino)diphenylamine, 4,4'-bis(dimethylamino)-N-methyldiphenylamine, 4,4'-bis(isopropylamino)diphenylamine, 4,4'-bis(phenylamino)diphenylamine, 4-(dimethylamino)-4'-(isopropylamino)-N-methyldiphenylamine, 4,4'-bis(cyclohexylamino)-N-methyldiphenylamine, 4-(dimethylamino)-4'(1-methylhexylamino)diphenylamine and the like. Most preferably, 4,4'-bis(dimethylamino)diphenylamine is used.

In the practice of the invention, the diphenylamines are used in amounts of from 0.01 to 1.0 mole per liter of the electrolytic solution, which may, more or less, vary depending on the types of solvent and electrolyte and the required display performance. The term "electrolytic solution" means an electrolyte dissolved in solvent.

The diphenylamines of the invention can form two different colors at the display electrode by application of two different potentials. More specifically, when a potential of +1.0 to +1.5 volts is applied across the paired electrodes so that the potential at the display electrode becomes positive, a clear green color appears on the white background. If the applied potential is increased up to +1.7 to 2.2 volts, a clear bluish green develops. These colors may be readily erased by returning the potential to zero or reversing the electrode polarity. It will be noted that the voltage applied may vary depending on the type of material for the counter electrode, the types of of electrolyte and electrochromic material and the distance between the paired electrodes. If the counter electrode is made of a metallic film or indium-tin oxide or tin oxide film, the potentials are within the above-defined ranges. However, if other type of material defined before is used as the counter electrode, the potential ranges may vary to a slight extent.

The reason why two different colors are formed by application of different potentials to the cell is considered as follows. At the display electrode surface, the cation radical of a diphenylamine, i.e. DPA+, generates by application of the lower positive potential. At the higher potential, di-cation radical, DPA$^{2+}$, generates. The mono and di cations are considered to correspond to the green and bluish green colors, respectively.

The cell using the diphenylamines defined above suffers little electrochemical deterioration during the color formation and erasure cycles exceeding $10^6$, revealing that the electrochromic solution is very stable over a long period of time.

According to another embodiment of the invention, the diphenylamines defined before, which can be anodically oxidized to form colors or colored species, are used in combination with other type of electrochromic material which undergoes cathodical reduction to form a color different from the colors from the diphenylamine compounds. As a result, multicolor display becomes possible.

Examples of the electrochromic materials capable of forming a color by reduction include anthraquinone compounds such as, for example, 2-ethylanthraquinone (pink in color), 2-t-butylanthraquinone (pink), 2-amylanthraquinone (pink), 1,8-diphenoxyanthraquinone (purple), benzo-alpha-anthracene-9,10-dione (blue) and the like. These anthraquinone compounds are known to form colored species as indicated above at the display electrode when a negative potential of about $-1.5$ to $-2.0$ volts are applied across the paired electrodes. In this state, the diphenylamine used in combination is oxidized to form a color or colored species at the counter electrode which is not visually observed since the optical diffuser, described before, is provided between the paired electrode. The color formed by the anthraquinone compound can be immediately erased by application of a potential of 0 to $+0.5$ volts to the cell or by reversing the electrode polarity. Accordingly, the electrochromic device using combinations of the phenylamine and anthraquinone compounds defined before can display four different colors including white, green, greenish blue and a color which depends on the type of anthraquinone.

The anthraquinone compounds are used in amounts of 0.01 to 1 mole per liter of the electrolyte solution used. Aside from anthraquinone compounds, any other electrochromic materials capable of developing colors by reduction may be likewise used. Examples of such materials include furyl, dipyridinium compounds and the like.

In the multicolor system, the combination of an electrolyte solvent, diphenylamine and anthraquinone gives an influence on the clearness of developed colors. Preferable combinations include tetraalkylammonium fluoroborate as the electrolyte, propylene carbonate as the solvent, 4,4'-bis(dimethylamino)diphenylamine and 2-t-butylanthraquinone or 2-amylanthraquinone. The tetraalkylammonium fluoroborates include tetramethylammonium, tetraethylammonium and tetrabutylammonium fluoroborates, of which tetrabutylammonium fluoroborate is preferred because of the good solubility in the solvent. The reason why the above diphenylamine and anthraquinone compounds are used is due to the high solubility in solvent and the clearness in color.

The present invention is more particularly described by way of examples.

EXAMPLE 1

Tetrabutyl fluoroborate (N(C$_4$H$_9$)$_4$BF$_4$ was dissolved in propylene carbonate in an amount of 0.5 mole/liter, followed by further dissolving a diphenylamine compound of the following formula (A), serving as an electrochromic material, in an amount of 0.2 mole/liter the electrolytic solution.

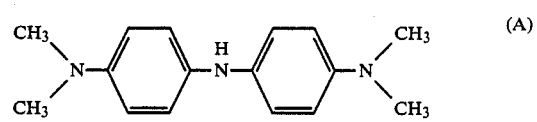

The resulting solution was filled in a display cell of the type shown in the sole figure, in which indium-tin oxide films were used as the paired electrodes 3,4 and a porous TiO$_2$ layer was used as the optical diffuser 6.

When a potential of $+1.2$ to $+1.5$ volts was applied across the display electrode 4 and the counter electrode 4 so that the display electrode became positive, a clear green color appeared at the display electrode against the white background. When the voltage was increased up to $+1.8$ to $+2.2$, a clear bluish green color appeared. Thereafter, when the voltage was returned to zero or the electrode polarity was reversed, the colors were immediately erased or bleached.

The cell was subjected to the color formation and erasure cycle test, with the result that little or no electrochemical deterioration of the cell was recognized to the extent of at least $10^6$ cycles or over. Thus, it was found that the electrochromic solution containing the organic diphenylamine was very stable.

EXAMPLE 2

The general procedure of Example 1 was repeated using 4,4'-bis(dimethylamino)-N-methyldiphenylamine instead of the compound of the formula (A). Similar results were obtained.

EXAMPLE 3

The general procedure was repeated using 4,4'-bis-(isopropylamino)diphenylamine, 4,4'-bis(phenylamino)-diphenylamine, 4-(dimethylamino-4'-(isopropylamino)-N-methyldiphenylamine and 4-(dimethylamino)-4'-(1-methylhexylamino)diphenylamine. Similar results were also obtained.

EXAMPLE 4

The general procedure of Example 1 was repeated except that 0.2 mole/liter of 2-t-butylanthraquinone, serving as an elctrochromic material of the reduction type, was further added to the electrochromic solution.

The resultant electrochromic cell was initially observed to be white in color through the display electrode when no voltage was applied. This white color was attributed to the optical diffuser. When a voltage of $-1.5$ to $-2.0$ volts was applied across the paired electrodes 3 and 4 so that the the voltage of the display electrode 3 was negative, a clear pink red color appeared at the display electrode 3. This resulted from the selective color formation of 2-t-butylanthraquinone contained in the solution. At the same time, the compound (A) was oxidized at the counter electrode to form a color. However, the formed color was not visually observed through the display electrode since the optical diffuser was provided between the electrodes, but only the pink color on the display electrode 3 was observed. When the applied voltage was returned to zero or changed to about +0.5 volts, the pink color was immediately erased and returned to the white background color.

On the other hand, when a potential of +1.0 to +1.5 volts was applied so that the voltage at the display electrode 3 became positive, a clear green color appeared on the display electrode and could be erased on application of a potential of 0 volt or a potential of reverse polarity of about −0.5 volts. Moreover, when a potential of +1.7 to +2.2 volts was applied so that the display electrode became positive with respect to the application voltage, a clear bluish green color appeared at the display electrode. This color could be erased in the same manner as mentioned above. The green and bluish green colors were ascribed to the oxidation-type electrochromic compound (A), which had two different color formation potentials. At the time when the green or bluish green color formation took place at the display electrode, the pink color appeared at the counter electrode. However, this pink color was shut off by means of the optical diffuser.

As will be apparent from he above example, the display cell using different types of electrochromic materials in combination, four different display colors are shown including white, pink, green and bluish green colors at potentials of 0 volts, −1.5 to −2.0 volts, +1.0 to +1.5 volts, and +1.7 to +2.2 volts, respectively.

EXAMPLE 5

The general procedure of Example 4 was repeated using 4,4′-bis(dimethylamino)-N-methyldiphenylamine, thereby obtaining similar results.

EXAMPLE 6

The general procedure of Example 4 was repeated using 4-(dimethylamino)-4′-(1-methylhexylamino)diphenylamine, thereby obtaining similar results.

What is claimed is:

1. In an electrochromic display device which comprises a unit cell having a pair of electrodes spaced from each other, at least one of which is transparent and serves as a display electrode, a means for applying a potential across the cell for reversing the electrode polarity, an electrochromic solution filled in the cell, and an optical diffuser means disposed between the paired electrodes to provide a white background, the improvement wherein said electrochromic solution comprises, in an inert solution, an electrolyte and a diphenylamine compound which is capable of electrochemically reversible color formation and erasure, said diphenylamine compound being represented by the following general formula

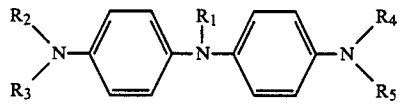

in which $R_1$ represents a hydrogen atom, unsubstituted or substituted alkyl group, or unsubstituted or substituted aralkyl, and $R_2$, $R_3$, $R_4$ and $R_5$ independently represent a hydrogen atom, unsubstituted or substituted alkyl, unsubstituted or substituted aralkyl group, unsubstituted or substituted aryl group, and cycloalkyl group.

2. The electrochromic display device according to claim 1, wherein said electrolyte is used in an amount of from 0.01 to 1.0 mole per liter of the solvent, and said diphenylamine is in an amount of from 0.01 to 1.0 mole per liter of the electrolytic solution.

3. The electrochromic display device according to claim 1, wherein said device forms a clear green color at the display electrode when a potential of +1.0 to +1.5 volts is applied across the cell and a bluish green color on application of a potential of +1.7 to +2.2 volts across the cell.

4. The electrochromic display device according to claim 1, wherein said optical diffuser means is a porous $TiO_2$ layer formed on the display electrode.

5. In an electrochromic display device which comprises a unit cell having a pair of electrodes spaced from each other, at least one of which is transparent and serves as a display electrode, a means for applying a potential across the cell and for reversing the electrode polarity, an electrochromic solution filled in the cell, and an optical diffuser means provided between the paired electrodes to provide a white background so as to permit formation of a clear color at one of the electrodes while preventing visual observation of another color formed at the other electrode, the improvement wherein said electrochromic solution comprises, in an inert solution, an electrolyte and a mixture of (1) a diphenylamine compound, which is capable of electrochemically reversible color formation and erasure at the display electrode at one electrode polarity and is able to form two different colors on application of different potentials across the cell, and (2) an electrochromic compound which is able to form a color by reduction, and which is capable of electrochemically reversible color formation and erasure at the display electrode at the other electrode polarity and is able to form a color different from the two colors, said diphenylamine compound being represented by the following general formula

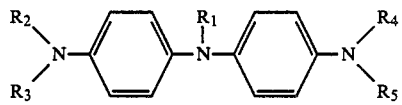

in which $R_1$ represents a hydrogen atom, unsubstituted or substituted alkyl group, or unsubstituted or substituted aralkyl, and $R_2$, $R_3$, $R_4$ and $R_5$ independently represent a hydrogen atom, unsubstituted or substituted alkyl, unsubstituted or substituted aralkyl group, unsubstituted or substituted aryl group, and cycloalkyl group.

6. The electrochromic display device according to claim 5, wherein said electrolyte is used in an amount of from 0.01 to 1.0 mole per liter of the solvent, and said diphenylamine and said electroochromic compound which is able to form a cooler by reduction are used in amounts of from 0.01 to 1 mole per liter of the resulting electrolytic solution, respectively.

7. The electrochromic display device according to claim 5, wherein said device forms a clear green color at said display electrode when a potential of +1.0 to +1.5 volts with respect to said display electrode is applied across the cell, a bluish green color on application of a potential of +1.7 to +2.2 volts across the cell, and a color, different from the above two colors, on application of a potential of −1.5 to −2.0 volts across the cell.

8. The electrochromic display device according to claim 5, wherein said electrochromic compound which is able to form a color by reduction is an anthraquinone compound.

9. The electrochromic display device according to claim 8, wherein said anthraquinone compound is a member selected from the group consisting of 2-ethylanthraquinone, 2-t-butylanthraquinone, 2-amylanthraquinone, 1,8-diphenoxyanthraquinone and benzo-alpha-anthracene-9,10-dione.

10. The electrochromic display device according to claim 5, wherein said electrolyte is a tetraalkylammonium fluoroborate, said solvent is propylene carbonate, said diphenylamine compound is 4,4'-bis(dimethylamino)-diphenylamine, and said electrochromic compound which is able to form a color by reduction is 2-t-butylanthraquinone or 2-amylanthraquinone.

11. The electrochromic display device according to claim 10, wherein said tetraalkylammonium fluoroborate is tetrabutylammonium fluoroborate.

12. In an electrochromic display device which comprises a unit cell having a pair of electrodes spaced from each other, at least one of which is transparent and serves as a display electrode, a means for applying a potential across the cell for reversing the electrode polarity, an electrochromic solution filled in the cell, and an optical diffuser means disposed between the paired electrodes to provide a white background, the improvement wherein said electrochromic solution comprises, in an inert solution, an electrolyte and a diphenylamine compound which is capable of electrochemically reversible color formation and erasure, wherein said diphenylamine compound is a member selected from the group consisting of 4,4'-bis(dimethylamino)diphenylamine, 4,4'-bis(dimethylamino)-N-methyldiphenylamine, 4,4'-bis-(isopropylamino)diphenylamine, 4,4'-bis(phenylamino)diphenylamine, 4-(dimethylamino-4'-(isopropylamino)-N-methyldiphenylamine, 4,4'-bis(cyclohexylamino)-N-methyldiphenylamine, and 4-(dimethylamino)-4'(1-methylhexylamino)diphenylamine.

13. The electrochromic display device according to claim 12, wherein said electrolyte is used in an amount of from 0.01 to 1.0 mole per liter of the solvent, and said diphenylamine is in an amount of from 0.01 to 1.0 mole per liter of the electrolytic solution.

14. The electrochromic display device according to claim 12, wherein said diphenylamine is 4,4'-bis(dimethylamino)diphenylamine.

15. The electrochromic display device according to claim 12, wherein said device forms forms a clear green color at the display electrode when a potential of +1.0 to +1.5 volts is applied across the cell and a bluish green color on application of a potential of +1.7 to +2.2 volts across the cell.

16. The electrochromic display device according to claim 12, wherein said optical diffuser means is a porous $TiO_2$ layer formed on the display electrode.

17. In an electrochromic display device which comprises a unit cell having a pair of electrodes spaced from each other, at least one of which is transparent and serves as a display electrode, a means for applying a potential across the cell and for reversing the electrode polarity, and electrochromic solution filled in the cell, and an optical diffuser means provided between the paired electrodes to provide a white background so as to permit formation of a clear color at one of the electrodes while preventing visual observation of another color formed at the other electrode, the improvement wherein said electrochromic solution comprises, in an inert solution, an electrolyte and a mixture of (1) a diphenylamine compound, which is capable of electrochemically reversible color formation and erasure at the display electrode at one electrode polarity and is able to form two different colors on application of different potentials across the cell, and (2) am electrochromic compound which is able to form a color by reduction, and which is capable of electrochemically reversible color formation and erasure at the display electrode at the other electrode polarity and is able to form a color different from the two colors, and wherein said diphenylamine compound is a member selected from the group consisting of 4,4'-bis(dimethylamino)-diphenylamine, 4,4'-bis(dimethylamino)-N-methyldiphenylamine, 4,4'-bis-(isopropylamino)diphenylamine, 4,4'-bis(phenylamino)diphenylamine, 4-(dimethylamino)-4'-(isopropylamino)-N-methyldiphenylamine, 4,4'-bis-(cyclohexylamino)-N-methyldiphenylamine, and 4-(dimethylamino)-4'(1-methylhexylamino)-diphenylamine.

18. The electrochromic display device according to claim 17, wherein said electrolyte is used in an amount of from 0.01 to 1.0 mole per liter of the solvent, and said diphenylamine and said compound which is able to form a color by reduction are used in amounts of from 0.01 to 1 mole per liter of the resulting electrolytic solution, respectively.

19. The electrochromic display device according to claim 17, wherein said diphenylamine is 4,4'-bis(dimethylamino)diphenylamine.

20. The electrochromic display device according to claim 17, wherein said device forms a clear green color at said display electrode when a potential of +1.0 to +1.5 volts with respect to said display electrode is applied across the cell, a bluish green color on application of a potential of +1.7 to +2.2 volts across the cell, and a color, different from the above two colors, on application of a potential of −1.5 to −2.0 volts across the cell.

21. The electrochromic display device according to claim 17, wherein said electrochromic compound which is able to form a color by reduction is an anthraquinone compound.

22. The electrochromic display device according to claim 21, wherein said anthraquinone compound is a member selected from the group consisting of 2-ethylanthraquine, 2-t-butylanthraquinone, 2-amylanthraquinone, 1,8,-diphenoxyanthraquinone and benzo-alpha-anthracene-9,10-dione.

* * * * *